US012764449B2

(12) United States Patent
Dong et al.

(10) Patent No.: US 12,764,449 B2
(45) Date of Patent: Oct. 13, 2026

(54) BLUETOOTH AUDIO PLAYBACK METHOD, ELECTRONIC DEVICE, AND STORAGE MEDIUM

(71) Applicant: HONOR DEVICE CO., LTD., Shenzhen (CN)

(72) Inventors: Jiyang Dong, Shenzhen (CN); Fukai Wang, Shenzhen (CN); Pengfei Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 229 days.

(21) Appl. No.: 18/703,967

(22) PCT Filed: Dec. 19, 2022

(86) PCT No.: PCT/CN2022/140138
§ 371 (c)(1),
(2) Date: Apr. 23, 2024

(87) PCT Pub. No.: WO2023/179123
PCT Pub. Date: Sep. 28, 2023

(65) Prior Publication Data
US 2025/0008251 A1 Jan. 2, 2025

(30) Foreign Application Priority Data
Mar. 22, 2022 (CN) ......................... 202210304730.5

(51) Int. Cl.
*H04R 1/10* (2026.01)
*G06F 3/16* (2006.01)

(52) U.S. Cl.
CPC .............. *H04R 1/10* (2013.01); *G06F 3/165* (2013.01); *H04R 2420/07* (2013.01)

(58) Field of Classification Search
CPC .............................. H04R 1/1041; H04R 5/033
(Continued)

(56) References Cited

U.S. PATENT DOCUMENTS 10,681,479 B2 6/2020 Zhao et al.
11,336,759 B2 5/2022 Liao et al.
(Continued)

FOREIGN PATENT DOCUMENTS

CN 1341933 A 3/2002
CN 102339626 A 2/2012
(Continued)

*Primary Examiner* — Alexander Krzystan
(74) *Attorney, Agent, or Firm* — WOMBLE BOND DICKINSON (US) LLP

(57) ABSTRACT

A Bluetooth audio playback method is applied to an electronic device. The electronic device is communicatively connected to a Bluetooth device. An application of the electronic device acquires audio data based on a playing command, creates Track tracks of the audio data based on the playing command, and determines a quantity of the Track tracks. The application sends a playing instruction to the Bluetooth device when determining that the quantity of the Track tracks increases, where the playing instruction is used for setting an audio status of the Bluetooth device to playing. The application sends a pause instruction to the Bluetooth device when the quantity of the Track tracks decreases, where the pause instruction is used for setting the audio status of the Bluetooth device to pause.

20 Claims, 7 Drawing Sheets

(58) Field of Classification Search
USPC .......................................................... 381/74
See application file for complete search history.

(56) References Cited

U.S. PATENT DOCUMENTS

| | | | | |
|---|---|---|---|---|
| 2002/0065570 | A1 | 5/2002 | Fujita et al. | |
| 2006/0258289 | A1 * | 11/2006 | Dua ........................ | H04W 4/70 455/41.3 |
| 2007/0257881 | A1 * | 11/2007 | Nurmela ........... | H04M 1/72403 345/156 |
| 2016/0227319 | A1 | 8/2016 | Zhao et al. | |
| 2023/0188919 | A1 * | 6/2023 | Kim ........................ | A63F 13/54 381/300 |
| 2025/0220356 | A1 * | 7/2025 | Sheen ...................... | H04R 3/00 |

FOREIGN PATENT DOCUMENTS

| | | | |
|---|---|---|---|
| CN | 103780943 | A | 5/2014 |
| CN | 109003618 | A | 12/2018 |
| CN | 110808021 | A | 2/2020 |
| CN | 111078448 | A | 4/2020 |
| CN | 111698355 | A | 9/2020 |
| CN | 114125791 | A | 3/2022 |
| GB | 2506404 | B | 3/2015 |

* cited by examiner

BLUETOOTH AUDIO PLAYBACK METHOD, ELECTRONIC DEVICE, AND STORAGE MEDIUM

CROSS-REFERENCE TO RELATED APPLICATIONS

This application is a national stage of International Application No. PCT/CN2022/140138, filed on Dec. 19, 2022, which claims priority to Chinese Patent Application No. 202210304730.5, filed on Mar. 22, 2022. The disclosures of both of the aforementioned applications are hereby incorporated by reference in their entireties.

TECHNICAL FIELD

This application relates to the field of Bluetooth communication, and specifically, to a Bluetooth audio playback method, an electronic device, and a storage medium.

BACKGROUND

When an application on an existing mobile phone uses a Bluetooth device to play audio, audio data and an audio status control instruction are transmitted through two protocols. The audio status control instruction is transmitted through the Audio/Video Remote Control Profile (Audio/Video Remote Control Profile, AVRCP), and the audio data is transmitted through a protocol for transmitting audio/a video between Bluetooth devices (Audio/Video Distribution Transport Protocol, AVDTP). Generally, in an Android system, an application needs to register with Mediasession (Mediasession) before the application can transmit an audio status through the AVRCP. However, in an existing case, an application that has registered with Mediasession may send audio data through the AVDTP and transmit an audio status control instruction through the AVRCP. However, an application that has not registered with Mediasession can only send audio data through the AVDTP, but cannot transmit an audio status control instruction through the AVRCP. As a result, the audio status control instructions sent by the application that has registered with Mediasession and the application that has not registered with Mediasession to the Bluetooth device are not uniform, the Bluetooth device cannot be compatible with the application that has registered with Mediasession and the application that has not registered with Mediasession, and the Bluetooth device encounters a playback exception when playing the audio data of the application that has not registered with Mediasession. For example, a mobile phone music player application that has registered with Mediasession sends an audio status control instruction to the Bluetooth device, and the Bluetooth device can receive the audio status control instruction sent by the mobile phone music player application to control played audio data. However, when the Bluetooth device is connected to an in-vehicle audio application that has not registered with Mediasession, because the in-vehicle audio application cannot send an audio status control instruction to the Bluetooth device, the Bluetooth device cannot play audio data of the in-vehicle audio application.

SUMMARY

In view of the foregoing content, it is necessary to provide a Bluetooth audio playback method, an electronic device, and a storage medium, to resolve a problem of unstable playback when a Bluetooth device plays audio data due to disorderly management of an audio status by different applications in the electronic device.

According to a first aspect, embodiments of this application provide a Bluetooth audio playback method, applied to an electronic device. The electronic device is communicatively connected to a Bluetooth device. The method includes: An application of the electronic device acquires audio data based on a playing command. The application creates Track tracks of the audio data based on the playing command, and determines a quantity of the Track tracks. The application sends a playing instruction to the Bluetooth device when determining that the quantity of the Track tracks increases, where the playing instruction is used for setting an audio status of the Bluetooth device to playing. The application sends a pause instruction to the Bluetooth device when determining that the quantity of the Track tracks decreases, where the pause instruction is used for setting the audio status of the Bluetooth device to pause. In the foregoing technical solution, when it is determined that the quantity of the Track tracks increases, the playing instruction is sent to the Bluetooth device to set the audio status of the Bluetooth device to playing, and when it is determined that the quantity of the Track tracks decreases, the pause instruction is sent to the Bluetooth device to set the audio status of the Bluetooth device to pause, to avoid a playback exception problem of the Bluetooth device caused by disorderly management of an audio status by different applications.

In an embodiment of this application, that the application creates Track tracks of the audio data based on the playing command, and determines a quantity of the Track tracks includes: An audio manager acquires the playing command from the application, creates the Track tracks of the audio data based on the playing command, and determines the quantity of the Track tracks. In the foregoing technical solution, the audio manager may create the Track tracks of the audio data, and determine the quantity of the Track tracks.

In an embodiment of this application, that the application sends a playing instruction to the Bluetooth device when determining that the quantity of the Track tracks increases includes: A hardware abstraction layer of the electronic device acquires the quantity of the Track tracks from an audio framework layer. The hardware abstraction layer sends the audio status being playing to a Bluetooth protocol stack of the hardware abstraction layer when determining that the quantity of the Track tracks increases. The Bluetooth protocol stack sends the playing instruction to the Bluetooth device in response to the audio status being playing. In the foregoing technical solution, when determining that the quantity of the Track tracks increases, the hardware abstraction layer sends the playing instruction to the Bluetooth device through the Bluetooth protocol stack.

In an embodiment of this application, that the application sends a pause instruction to the Bluetooth device when determining that the quantity of the Track tracks decreases includes: The electronic device sends the audio status being pause to the Bluetooth protocol stack when determining that the quantity of the Track tracks decreases. The Bluetooth protocol stack sends the pause instruction to the Bluetooth device in response to the audio status being pause. In the foregoing technical solution, when determining that the quantity of the Track tracks decreases, the hardware abstraction layer sends the pause instruction to the Bluetooth device through the Bluetooth protocol stack.

In an embodiment of this application, that the audio manager determines the quantity of the Track tracks includes: The audio manager acquires a pause command from the application; and the audio manager deletes the Track tracks based on the pause command, and determines the quantity of the Track tracks. In the foregoing technical solution, the Track tracks can be deleted based on the pause command.

In an embodiment of this application, that the audio manager determines the quantity of the Track tracks includes: The audio manager deletes the Track tracks when determining that playback of the audio data ends. In the foregoing technical solution, the audio manager may delete the Track tracks when the playback of the audio data is finished.

In an embodiment of this application, that the audio manager determines the quantity of the Track tracks includes: In response to an operation of switching from audio data of a first playing scenario to audio data of a second playing scenario of the application, the audio manager deletes the Track tracks of the audio data of the first playing scenario, and creates Track tracks of the audio data of the second playing scenario, where the audio data of the first playing scenario and the audio data of the second playing scenario are not continuous. In the foregoing technical solution, when a user switches from the audio data of the first playing scenario to the audio data of the second playing scenario, the Track tracks of the audio data of the first playing scenario can be deleted, and the Track tracks of the audio data of the second playing scenario can be created.

In an embodiment of this application, that the audio manager determines the quantity of the Track tracks includes: In response to an operation of clicking a previous track button or a next track button on a music play interface of a music player by a user, the audio manager deletes Track tracks of audio data of music currently played by the music player, and creates Track tracks of audio data of music of the previous track button or the next track button. In the foregoing technical solution, when the user performs the operation of clicking the previous track button or the next track button, the Track tracks of the audio data of the music currently played by the music player can be deleted, and the Track tracks of the audio data of the music of the previous track button or the next track button can be created.

In an embodiment of this application, the application includes a music player, and that an application of an application layer acquires audio data based on a playing command includes: In response to an operation of clicking a play button on a music play interface of the music player by the user, the music player generates the playing command, and acquires the audio data based on the playing command. In the foregoing technical solution, after the user clicks the play button on the music play interface, the audio data can be acquired, to facilitate operations by the user.

In an embodiment of this application, that the Bluetooth protocol stack sends the playing instruction to the Bluetooth device based on the audio status being playing or sends the pause instruction to the Bluetooth device based on the audio status being pause includes: The Bluetooth protocol stack sends the playing instruction or the pause instruction to the Bluetooth device through the Audio/Video Remote Control Profile (Audio/Video Remote Control Profile, AVRCP).

In an embodiment of this application, that the hardware abstraction layer sends the audio status being playing to a Bluetooth protocol stack of the hardware abstraction layer when determining that the quantity of the Track tracks increases includes: The hardware abstraction layer sends the audio status being playing to the Bluetooth protocol stack of the hardware abstraction layer when determining that the quantity of the Track tracks is changed from 0 to 1. In the foregoing technical solution, when determining that the quantity of the Track tracks is changed from 0 to 1, the hardware abstraction layer sends the playing instruction to the Bluetooth device through the Bluetooth protocol stack to set the audio status of the Bluetooth device to playing.

In an embodiment of this application, that the hardware abstraction layer sends the audio status being pause to the Bluetooth protocol stack when determining that the quantity of the Track tracks decreases includes: The hardware abstraction layer sends the audio status being pause to the Bluetooth protocol stack when determining that the quantity of the Track tracks is changed from 1 to 0. In the foregoing technical solution, when it is determined that the quantity of the Track tracks is changed from 1 to 0, the pause instruction is sent to the Bluetooth device through the Bluetooth protocol stack to set the audio status of the Bluetooth device to pause.

According to a second aspect, embodiments of this application provide an electronic device, including a processor and a memory, where the processor is coupled to the memory; the memory is configured to store program instructions; and the processor is configured to read the program instructions stored in the memory to implement the foregoing Bluetooth audio playback method.

According to a third aspect, embodiments of this application provide a computer-readable storage medium, where the computer-readable storage medium stores program instructions, and when the program instructions are executed by a processor, the foregoing Bluetooth audio playback method is performed.

In addition, for technical effects brought by the second aspect and the third aspect, refer to the related descriptions of the method in the designs of the method part. Details are not described herein again.

BRIEF DESCRIPTION OF DRAWINGS

To describe the technical solutions in embodiments of this application more clearly, the following briefly describes the accompanying drawings in the embodiments. It should be understood that, the accompanying drawings below only show some embodiments of this application, and therefore should not be considered as limitations on the scope. A person of ordinary skill in the art may still derive other related drawings from the accompanying drawings without creative efforts.

DESCRIPTION OF EMBODIMENTS

Figure 1A:
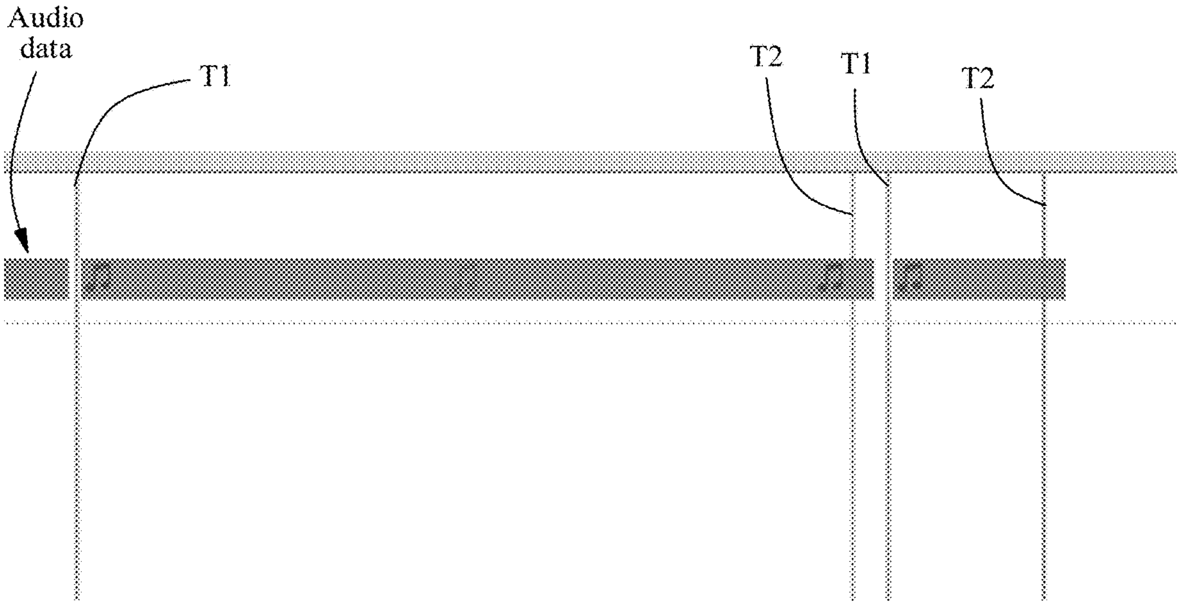
FIG. 1A and FIG. 1B are schematic diagrams of an electronic device playing an audio data stream and an audio status according to an embodiment of this application.

The terms "first" and "second" below are used merely for the purpose of description, and shall not be construed as indicating or implying relative importance or implying a quantity of indicated technical features. Therefore, features defined by "first" and "second" may explicitly or implicitly include one or more such features. In the descriptions of embodiments of this application, words such as "example" or "for example" are used to mean an example, an illustration, or a description. Any embodiment or design scheme described by using "example" or "for example" in embodiments of this application should not be explained as being more preferred or having more advantages than another embodiment or design scheme. In particular, the terms such as "exemplary" and "example" as used herein are intended to present the related concepts in a specific manner.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application. It should be understood that, unless otherwise stated in this application, "/" means or. For example, A/B may represent A or B. In this application, "and/or" describes only an association relationship for describing associated objects and indicates that three relationships may exist. For example, A/B may indicate the following three cases: Only A exists, both A and B exist, and only B exists. "At least one" means one or more. "A plurality of" means two or more. For example, at least one of a, b, or c may indicate seven cases: a, b, c, a and b, a and c, b and c, and a, b, and c.

To facilitate the following description of embodiments, a user interface (User Interface, UI) in embodiments of this application is first briefly described. The UI is a media interface for an interaction and information exchange between an application or an operating system and a user, and may implement conversion between an internal form of information and a form acceptable to the user. A user interface of an application is source code written in specific computer language such as JAVA or extensible markup language (extensible markup language, XML). The source code of the interface is parsed and rendered on an electronic device, and is finally presented as content that can be recognized by a user, for example, a control such as a picture, text, or a button. A control (control) is a basic element of the user interface. Typical controls include a button (button), a widget (widget), a toolbar (toolbar), a menu bar (menu bar), a text box (text box), a scrollbar (scrollbar), an image (image), and text (text). An attribute and content of the control in the interface are defined by using a label or a node. For example, the control included in the interface is defined in the XML by using a node such as <Textview>, <ImgView>, or <Video View>. One node corresponds to one control or attribute in the interface. After being parsed and rendered, the node is presented as user-visible content. In addition, interfaces of many applications, such as hybrid applications (hybrid application), usually further include web pages. A web page, also referred to as a page, may be understood as a special control embedded in an application interface. The web page is source code written in a specific computer language, such as a hyper text markup language (hyper text markup language, HTML), cascading style sheets (cascading style sheets, CSS), or JAVA scripts (JavaScript, JS). The source code of the web page may be loaded and displayed as user-recognizable content by a browser or a web page display component with similar functions to the browser. Specific content included in the web page is also defined by using a label or a node in the source code of the web page. For example, an element and an attribute of the web page are defined in the HTML by using <p>, <img>, <video>, and <canvas>.

A common representation of the user interface is a graphic user interface (graphic user interface, GUI), which is a graphically displayed user interface related to computer operations. It may be an interface element such as an icon, a window, or a control that is displayed on a display screen of an electronic device.

Figure 1B:

When an existing audio application or video application plays audio data, Track tracks are created in an audio management system in an audio framework layer. A quantity of the Track tracks may be controlled by the audio application or the video application. FIG. 1A and FIG. 1B are schematic diagrams of an electronic device playing an audio data stream and an audio status according to an embodiment of this application.

FIG. 1A is a schematic diagram of an application that has registered with Mediasession plays an audio data stream and an audio status in the electronic device. In this embodiment, when an audio management system of the application that has registered with Mediasession plays Track tracks, audio data is sent to a Bluetooth device through a protocol for transmitting audio/a video between Bluetooth devices (Audio/Video Distribution Transport Protocol, AVDTP), and an audio status control instruction is sent to the Bluetooth device through the Audio/Video Remote Control Profile (Audio/Video Remote Control Profile, AVRCP). For example, when the application that has registered with Mediasession transports the audio data, a playing instruction T1 is sent to the Bluetooth device through the AVRCP or a pause instruction T2 is sent to the Bluetooth device through the AVRCP.

FIG. 1B is a schematic diagram of an application that has not registered with Mediasession plays an audio data stream and an audio status in the electronic device. In this embodiment, when an audio management system of the application that has not registered with Mediasession plays Track tracks, only audio data is sent to the Bluetooth device through the AVDTP, and an audio status control instruction cannot be sent to the Bluetooth device through the AVRCP. In this case, when the electronic device plays audio data of different applications, audio statuses and audio data streams are not consistent, resulting in a playback exception of the Bluetooth device.

Figure 2:
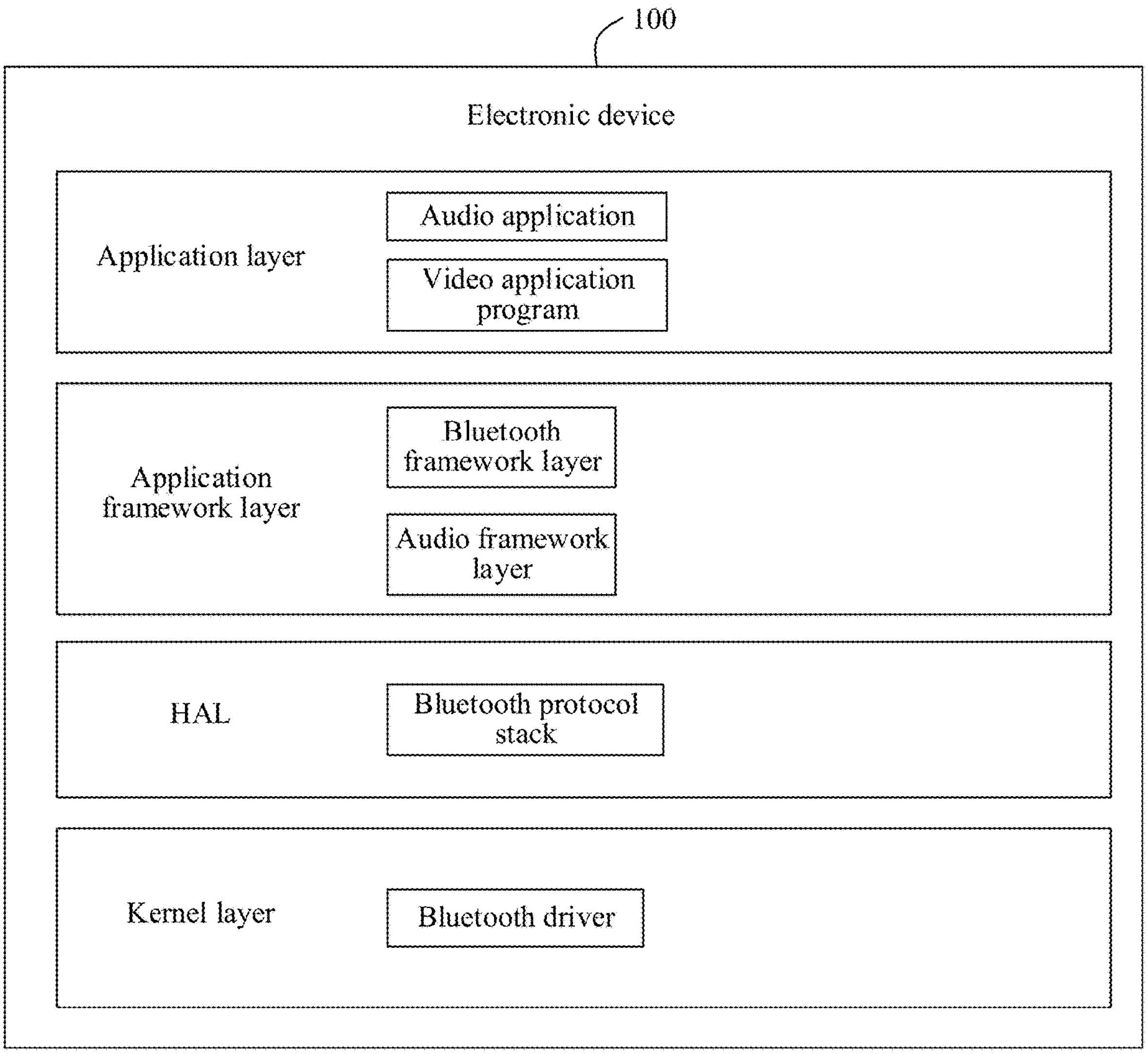
FIG. 2 is a structural block diagram of software of an electronic device according to an embodiment of this application.

In view of this, this application provides a Bluetooth audio playback method, to keep audio data and audio statuses consistent. The Bluetooth audio playback method is applied to an electronic device 100. FIG. 2 is a structural block diagram of software of the electronic device 100 according to an embodiment of this application. A layered architecture divides the software into an application layer, an application framework layer, a hardware abstraction layer (Hardware Abstraction Layer, HAL), and a kernel layer from top to bottom.

The application layer may include a series of application packages. As shown in FIG. 2, the application packages may include an audio application or a video application program.

The application framework layer provides an application programming interface (Application Programming Interface, API) and a programming framework for the application at the application layer. The application program framework layer includes some predefined functions. As shown in FIG. 1, the application framework layer may include a Bluetooth framework layer and an audio framework layer.

The hardware abstraction layer provides different hardware devices with a uniform access interface. As shown in FIG. 2, the HAL may include a Bluetooth protocol stack.

The kernel layer is a layer between hardware and software. The kernel layer includes at least various drivers, for example, includes a Bluetooth driver shown in FIG. 2.

Figure 3:
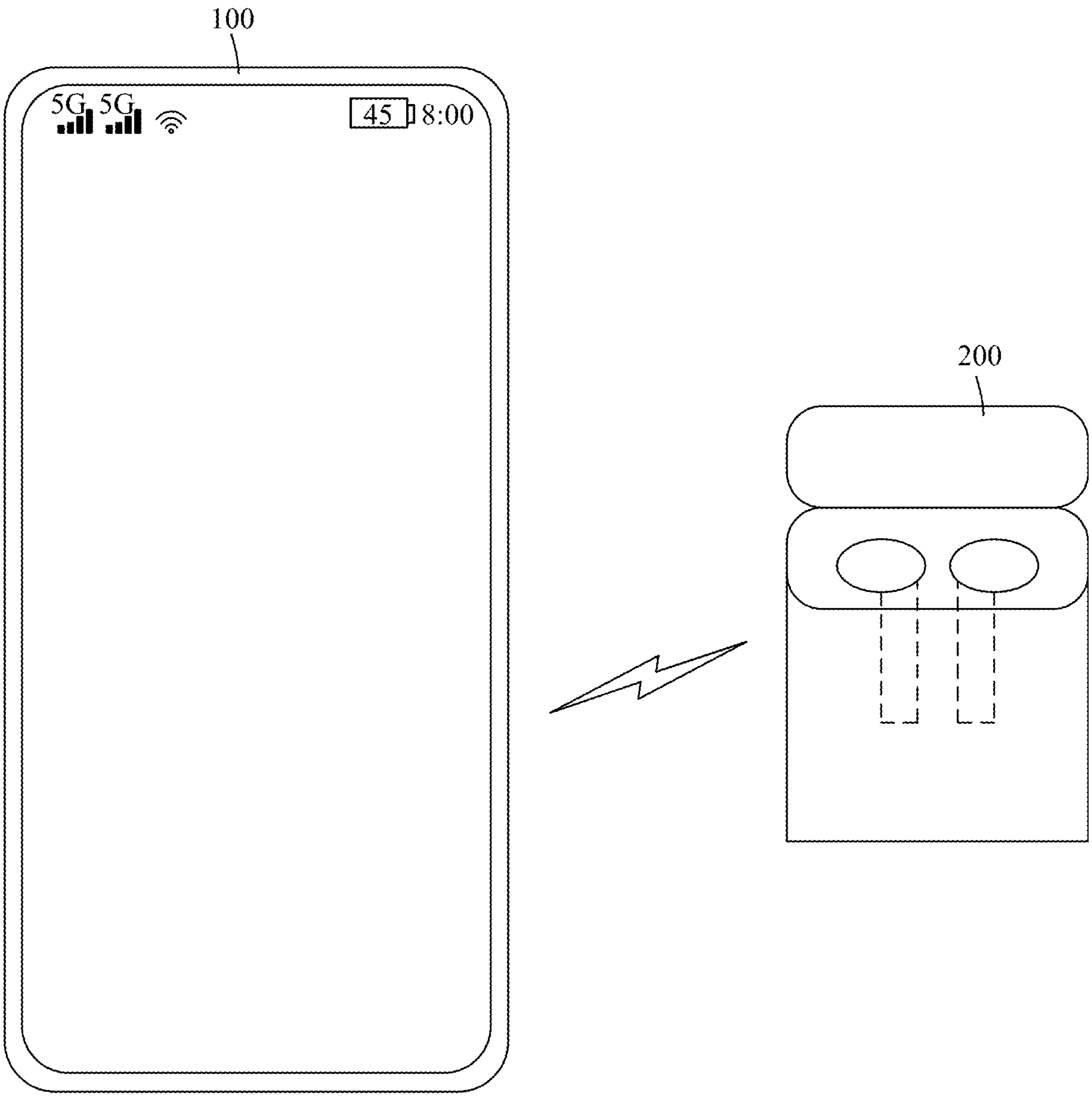
FIG. 3 is a diagram of an application environment of a Bluetooth audio playback method according to an embodiment of this application.

FIG. 3 is a diagram of an application environment of a Bluetooth audio playback method according to an embodiment of this application. The Bluetooth audio playback method is applied to the electronic device 100. The electronic device 100 is communicatively connected to a Bluetooth device 200 by a Bluetooth communication module. In an embodiment, the electronic device 100 includes, but is not limited to, a smartphone, a laptop device, a desktop computer, a handheld PC, a personal digital assistant, an embedded processor, a digital signal processor (Digital Signal Processor, DSP for short), a graphical device, a video game device, a set-top box, a microcontroller, a cellular phone, a portable media player, a handheld device, a wearable device (for example, display glasses or goggles, a head-mounted display (Head-Mounted Display, HMD for short), a watch, a head-mounted device, an armband, jewelry, or the like), a virtual reality (Virtual Reality, VR for short) and/or augmented reality (Augmented Reality, AR for short) device, an internet of things (Internet of Things, IoT) device, a smart stereo system, an in-vehicle infotainment device, a streaming media client device, an electronic book reading device, a POS machine, a control system of an electric vehicle, and various other electronic devices. In an embodiment, the Bluetooth device 200 includes a Bluetooth device such as a Bluetooth headset or a Bluetooth speaker having a Bluetooth audio playback capability.

Figure 4:
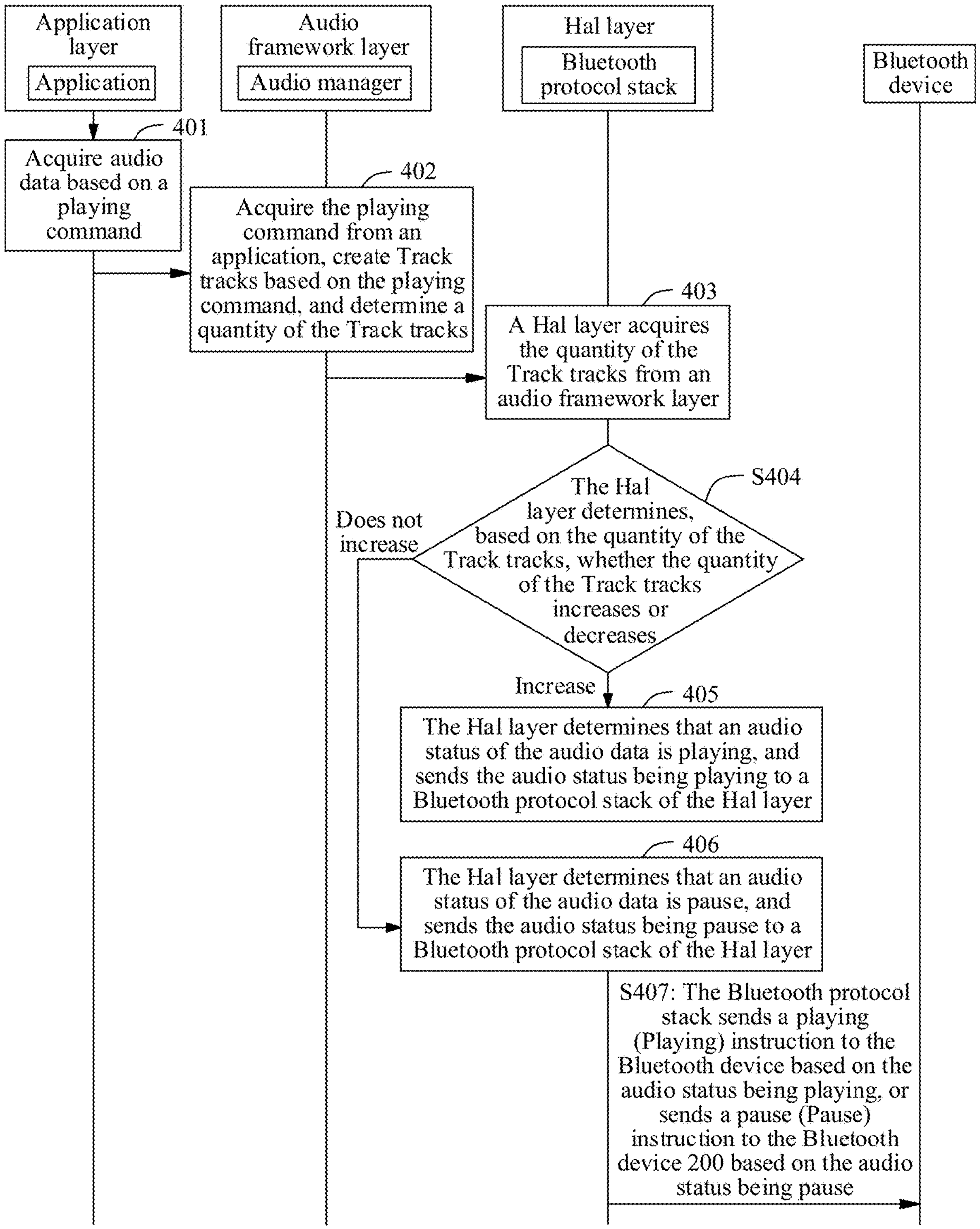
FIG. 4 is a flowchart of a Bluetooth audio playback method according to an embodiment of this application.

FIG. 4 is a flowchart of a Bluetooth audio playback method according to an embodiment of this application. The method includes the following steps.

Step S401: An application of an application layer acquires audio data based on a playing command.

In this embodiment, the application of the application layer includes an audio application or a video application. The Bluetooth audio playback method provided in this application is described below by using an example in which the application is a music player, the electronic device 100 is a mobile phone, and the Bluetooth device 200 is a Bluetooth headset.

Figure 5:
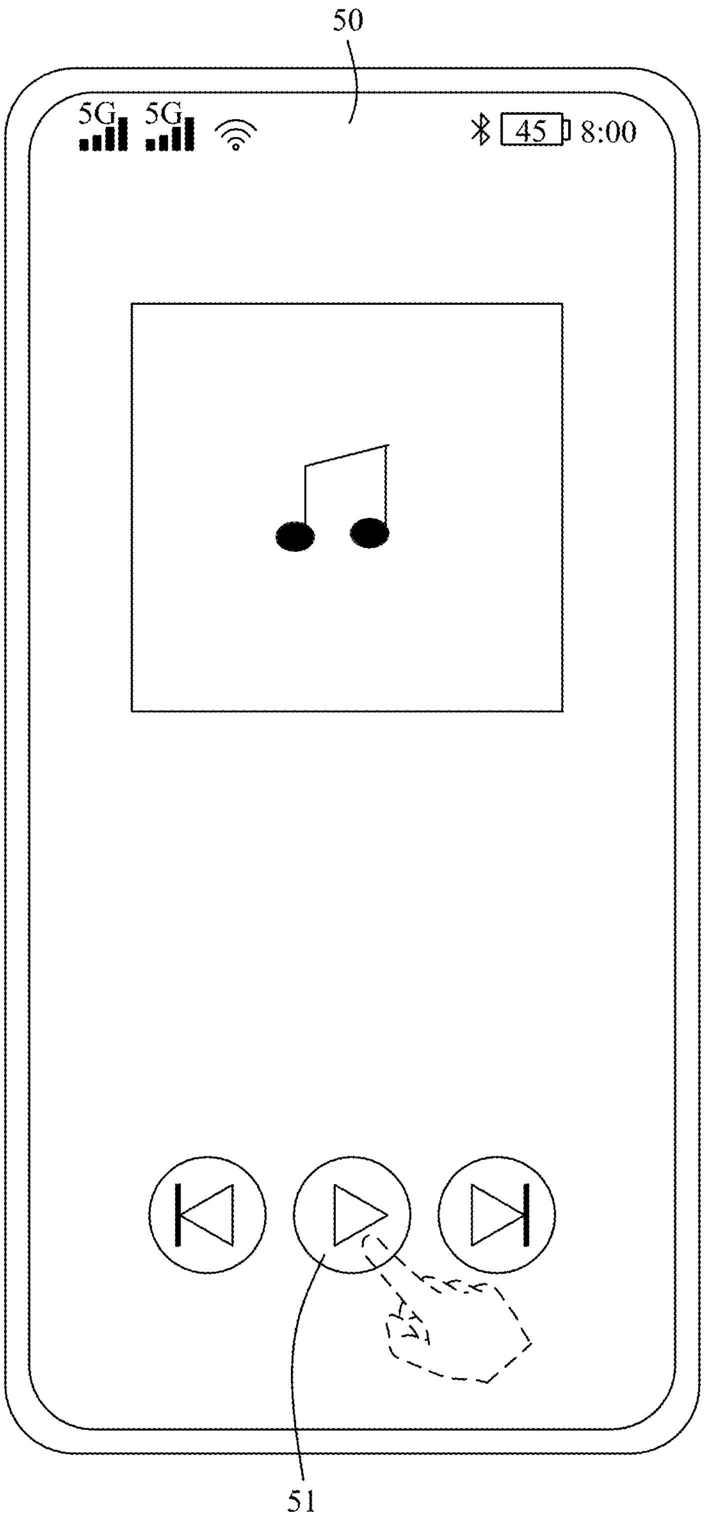
FIG. 5 is a schematic diagram of a music player acquiring audio data according to an embodiment of this application.

Referring to FIG. 5, when a user clicks a play/pause button 51 on a music play interface 50 of the music player on the mobile phone, the music player generates a playing command in response to an operation of clicking a play/ button 51 on the music play interface 50 by the user. The music player acquires the audio data based on the playing command.

Step S402: An audio manager of an audio framework layer acquires the playing command or a pause command from the application, creates Track tracks of the audio data based on the playing command or the pause command, and determines a quantity of the Track tracks.

In an embodiment, that an audio manager determines a quantity of the Track tracks includes: The audio manager deletes the Track tracks when determining that playback of the audio data ends. In this embodiment, the Track tracks are created when the audio data is acquired; and the Track tracks are deleted when the playback of the audio data ends. For example, when the music player on the mobile phone acquires a playing command of a song, the audio manager of the audio framework layer creates Track tracks, and when the music player finishes playing audio data of the song, the audio manager of the audio framework layer deletes the Track tracks.

In an embodiment, that an audio manager determines a quantity of the Track tracks includes: The audio manager acquires the pause command from the application; and the audio manager deletes the Track tracks based on the pause command. For example, referring to FIG. 5, when the user clicks the play/pause button 51 on the music play interface 50 of the music player on the mobile phone, the music player generates a pause command in response to an operation of clicking the play/button 51 on the music play interface 50 by the user. The audio manager acquires the pause command from the music player; and the audio manager deletes the Track tracks based on the pause command.

In an embodiment, that an audio manager determines a quantity of the Track tracks includes: In response to an operation of switching from audio data of a first playing scenario to audio data of a second playing scenario of the audio application or the video application, the audio manager deletes the Track tracks of the audio data of the first playing scenario, and creates Track tracks of the audio data of the second playing scenario, where the audio data of the first playing scenario and the audio data of the second playing scenario are not continuous.

Figure 6:
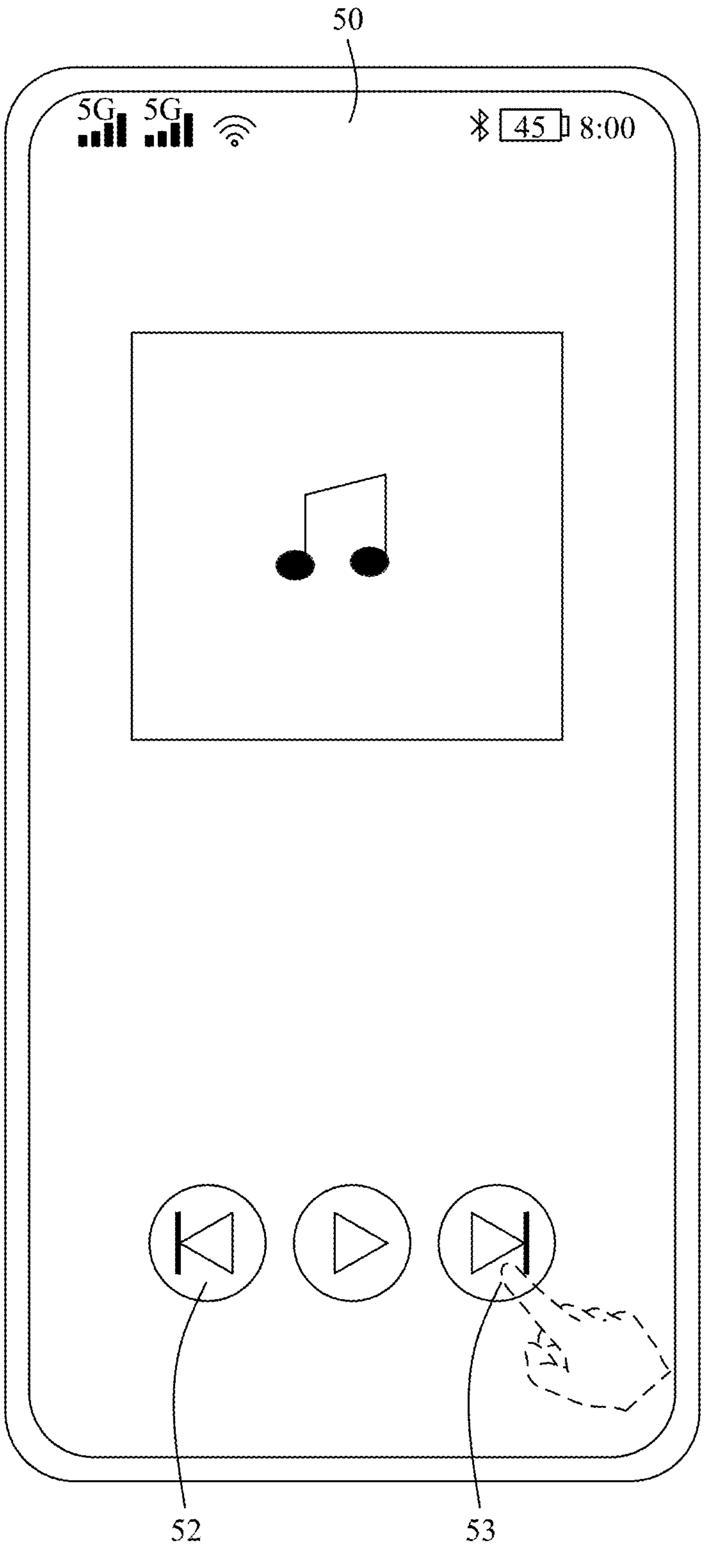
FIG. 6 is a schematic diagram of determining Track tracks according to an embodiment of this application.

For example, referring to FIG. 6, the music play interface 50 includes a previous track button 52 and a next track button 53. Audio data of currently played music is the audio data of the first playing scenario, and audio data of music of the previous track button 52 or the next track button 53 is the audio data of the second playing scenario. The user clicks the previous track button 52 or the next track button 53 on the music play interface 60 of the music player on the mobile phone. In response to an operation of clicking the previous track button 52 or the next track button 53 on the music play interface 50 by the user, the audio manager deletes Track tracks of the audio data of the currently played music, and creates Track tracks of the audio data of the music of the previous track button 52 or the next track button 53. The audio data of the currently played music and the audio data of the music of the previous track button 52 or the next track button 53 are not continuous.

Step S403: A Hal layer acquires the quantity of the Track tracks from the audio framework layer.

In an embodiment, when creating one Track track or deleting one Track track, the audio manager generates quantity update information of the Track tracks. The audio framework layer sends the quantity update information of the Track tracks to the Hal layer. The Hal layer acquires the quantity update information of the Track tracks sent by the audio framework layer and determines the quantity of the Track tracks.

Step S404: The Hal layer determines, based on the quantity of the Track tracks, whether the quantity of the Track tracks increases or decreases.

In this embodiment, if it is determined that the quantity of the Track tracks increases, Step S405 is performed, or otherwise, if it is determined that the quantity of the Track tracks decreases, Step S406 is performed.

Step S405: The Hal layer determines that an audio status of the audio data is playing, and sends the audio status being playing to a Bluetooth protocol stack of the Hal layer.

In an embodiment, that the Hal layer determines that an audio status of the audio data is playing, and sends the audio status being playing to a Bluetooth protocol stack of the Hal layer includes: When determining that the quantity of the Track tracks is changed from 0 to 1, the Hal layer determines that the audio status of the audio data is playing, and sends the audio status being playing to the Bluetooth protocol stack of the Hal layer.

Step S406: The Hal layer determines that an audio status of the audio data is pause, and sends the audio status being pause to a Bluetooth protocol stack of the Hal layer.

In an embodiment, that the Hal layer determines that an audio status of the audio data is pause, and sends the audio status being pause to the Bluetooth protocol stack of the Hal layer includes: When determining that the quantity of the Track tracks is changed from 1 to 0, the Hal layer sends the audio status being pause to the Bluetooth protocol stack.

Step S407: The Bluetooth protocol stack sends a playing instruction to the Bluetooth device 200 based on the audio status being playing, or sends a pause instruction to the Bluetooth device 200 based on the audio status being pause. The playing instruction is used for setting an audio status of the Bluetooth device 200 to a playing state, and the pause instruction is used for setting the audio status of the Bluetooth device 200 to a pause state.

In this embodiment, the Bluetooth protocol stack sends the playing instruction or the pause instruction to the Bluetooth device 200 through the AVRCP.

In this application, when detecting that the quantity of the Track tracks increases by 1, the Hal layer sends the playing instruction to the Bluetooth device through the Bluetooth protocol stack to set the audio status of the Bluetooth device to playing, and when detecting that the quantity of the Track tracks decreases by 1, sends the pause instruction to the Bluetooth device through the Bluetooth protocol stack to set the audio status of the Bluetooth device to pause, to avoid a playback exception problem of the Bluetooth device caused by disorderly management of an audio status by different applications.

It is to be noted that in another embodiment of this application, after acquiring the quantity of the Track tracks from the audio framework layer, the Hal layer sends the quantity of the Track tracks to the Bluetooth protocol stack. When determining, based on the quantity of the Track tracks, that the quantity of the Track tracks increases, the Bluetooth protocol stack determines that the audio status of the audio data is playing, and sends the playing instruction to the Bluetooth device 200 based on the audio status being playing; and when determining, based on the quantity of the Track tracks, that the quantity of the Track tracks decreases, the Bluetooth protocol stack determines that the audio status of the audio data is pause, and sends the pause instruction to the Bluetooth device 200 based on the audio status being pause.

Figure 7:
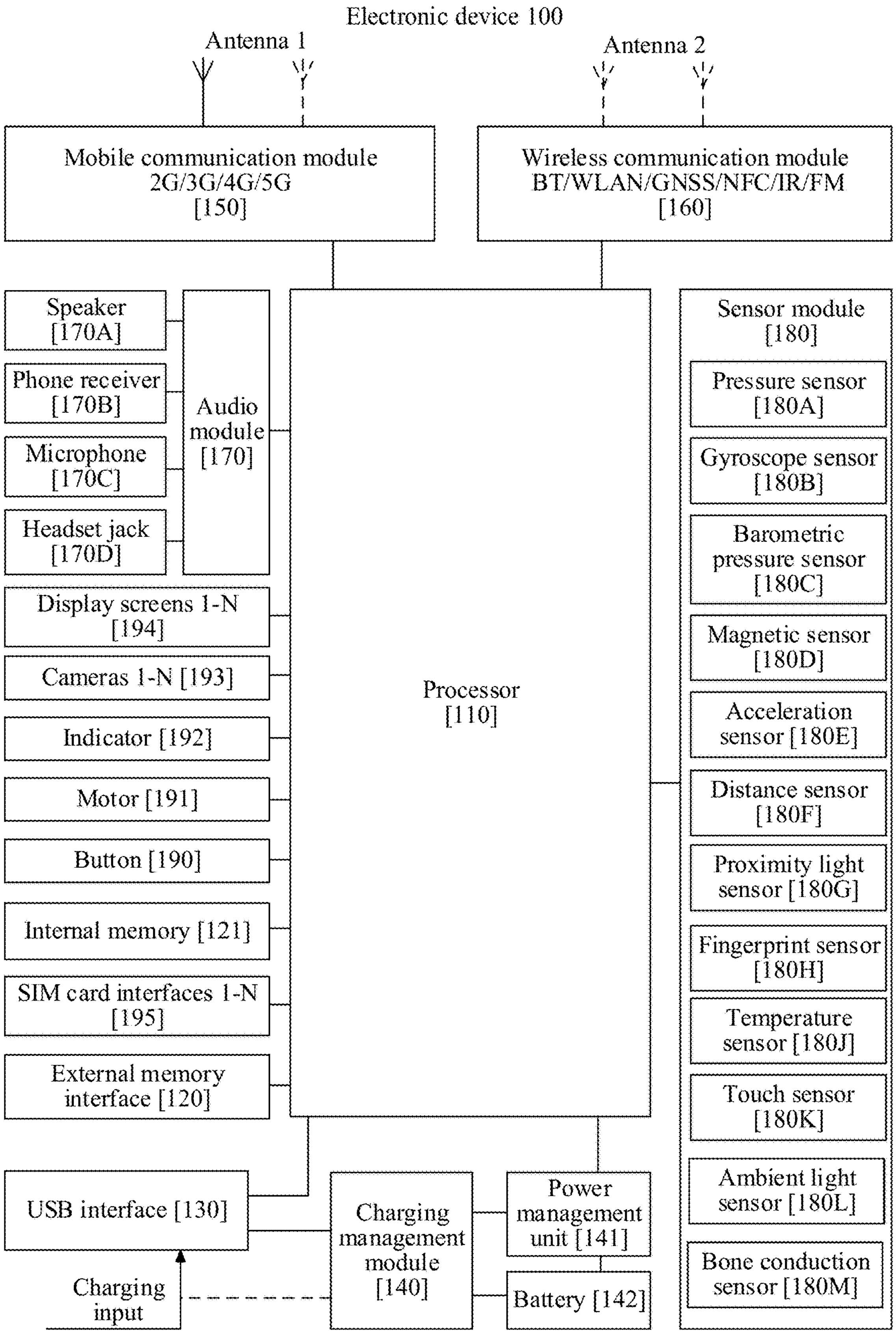
FIG. 7 is a schematic diagram of a structure of an electronic device according to an embodiment of this application.

The following describes an electronic device 100 in embodiments of this application. FIG. 7 is a schematic diagram of a hardware structure of the electronic device 100 according to an embodiment of this application. The electronic device 100 may be a mobile phone, a tablet computer, a desktop computer, a laptop computer, a handheld computer, a notebook computer, a ultra-mobile personal computer (ultra-mobile personal computer, UMPC), a netbook, and a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device 100 is not specifically limited in some embodiments of this application. In another embodiment, the electronic device 100 includes a calling terminal 10 and/or a called terminal 20.

In this embodiment, the electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, and/or a neural-network processing unit (Neural-network Processing Unit, NPU). Different processing units may be separate devices, or may be integrated into one or more processors.

The controller may generate an operation control signal according to instruction operation code and a time-sequence signal, and control obtaining and executing of instructions.

A memory may be further arranged in the processor 110, which is configured to store instructions and data. In some embodiments, the memory in processor 110 is a cache memory. The memory may store instructions or data recently used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The interface may include an inter-integrated circuit (Inter-Integrated Circuit, I2C) interface, an inter-integrated circuit sound (Inter-integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a bidirectional synchronous serial bus, including a serial data line (serial data line, SDA) and a serial clock line (derial clock line, SCL). In some embodiments, the processor 110 may include a plurality of I2C buses. The processor 110 may be coupled to the touch sensor 180K, a charger, a flash light, the camera 193, and the like by using different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of I2S buses. The processor 110 may be coupled to the audio module 170 by the I2S bus to implement communication between the processor 110 and the audio module 170. In some embodiments, the audio module 170 may transmit an audio signal to the wireless communication module 160 through the I2S interface, to perform a function of answering a call through a Bluetooth headset.

The PCM interface may also be used for audio communication, and sampling, quantization, and encoding of an analog signal. In some embodiments, the audio module 170 and the wireless communication module 160 may be coupled through the PCM bus interface. In some embodiments, the audio module 170 may also transfer an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is used for asynchronous communication. The bus may be a bidirectional communication bus. switches to-be-transmitted data between serial communication and parallel communication. In some embodiments, the UART interface is typically configured to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music by using a Bluetooth headset.

The MIPI may be configured to connect the processor 110 to a peripheral device such as the display 194 or the camera 193. The MIPI interface include a camera serial interface (camera serial interface, CSI), a display serial interface (display serial interface, DSI), and the like. In some embodiments, the processor 110 and the camera 193 communicate with each other by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 and the camera lens 193, the display 194, the wireless communication module 160, the audio module 170, the sensor module 180, or the like. The GPIO interface may alternatively be configured as an I2C interface, an I2S interface, a UART interface, a MIPI, and the like.

The USB interface 130 is an interface that complies with the USB standard specification, and may be specifically a mini USB interface, a micro USB interface, a USB type C interface, or the like. The USB interface 130 may be configured to connect to a charger to charge the electronic device 100, or may be configured to transmit data between the electronic device 100 and a peripheral device. The interface may alternatively be configured to be connected to a headset to play audio through the headset. The interface may alternatively be configured to connect to another electronic device 100, for example, an AR device.

It may be understood that an interface connection relationship between the modules that is shown in this embodiment of this application is merely an example for description, and constitutes no limitation on the structure of the electronic device 100. In some other embodiments of the present application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or may be a wired charger. In some embodiments of wired charging, the charge management module 140 may receive charging input from the wired charger through the USB interface 130. In some embodiments of wireless charging, the charge management module 140 may receive wireless charging input through a wireless charging coil of the electronic device 100. The charging management module 140 may supply power to the electronic device 100 through the power management unit 141 while charging the battery 142.

The power management module 141 is connected to the battery 142, the charging management module 140, and the processor 110. The power management module 141 receives input of the battery 142 and/or the charging management module 140, and supplies power for the processor 110, the internal memory 121, the display screen 194, the camera 193, the wireless communication module 160, and the like. The power management module 141 may further be configured to monitor parameters such as a battery capacity, a quantity of battery cycles, and a battery health status (power leakage and impedance). In some other embodiments, the power management module 141 may alternatively be arranged in the processor 110. In some other embodiments, the power management module 141 and the charging management module 140 may alternatively be arranged in a same device.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication bands. Different antennas may be multiplexed to improve utilization of the antennas. For example, the antenna 1 may be multiplexed as a diversity antenna of a wireless local area network. In some other embodiments, the antennas may be used with a tuning switch.

The mobile communication module 150 may provide a solution applied to the electronic device 100 for wireless communication including 2G/3G/4G/5G and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some function modules in the mobile communication module 150 may be disposed in the processor 110. In some embodiments, at least some of the functional modules of the mobile communication module 150 may be arranged in a same device as at least some of modules of the processor 110.

The modulation and demodulation processor may include a modulator and a demodulator. The modulator is configured to modulate a low frequency baseband signal to be sent into a medium and high frequency signal. The demodulator is configured to demodulate the received electromagnetic wave signal into a low-frequency baseband signal. Then, the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 170A, the receiver 170B, and the like), or displays an image or a video through the display screen 194. In some embodiments, the modulation and demodulation processor may be an independent device. In some other embodiments, the modem processor may be independent of the processor 110, and the modem processor and the mobile communication module 150 or another functional module are disposed in a same device.

The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communications technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the application processor, and the like. The GPU is a microprocessor for image processing and is connected to the display 194 and the application processor. The GPU is configured to perform mathematical and geometric calculations and graphics rendering. The processor 110 may include one or more GPUs, and the GPU executes program instructions to generate or change display information.

The display screen 194 is configured to display, for example, an image and a video. The display 194 may include a display panel. The display panel may be a liquid crystal display (liquid crystal display, LCD), an organic light-emitting diode (organic light-emitting diode, OLED), an active-matrix organic light-emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N displays 194, where N is a positive integer greater than 1.

The electronic device 100 may implement a photographing function through the ISP, the camera 193, the video codec, the GPU, the display screen 194, the application processor, and the like.

The ISP is configured to handle data returned by the camera 193. For example, when photographing is performed, a shutter is pressed, and light is transmitted to a photosensitive element of the camera through a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scene. In some embodiments, the ISP may be disposed in the camera lens 193.

The camera 193 is configured to capture a still image or a video. An optical image of an object is generated through a lens and is projected onto a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include 1 or N cameras 193. N is a positive integer greater than 1.

The digital signal processor is configured to process a digital signal. In addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more types of video encoder and decoders. Therefore, the electronic device 100 may play or record videos in a plurality of encoding formats, such as moving picture experts group (moving picture experts group, MPEG) 1, MPEG2, MPEG3, and MPEG4.

The NPU is a neural-network (neural-network, NN) computing processor, quickly processes input information by referring to a structure of a biological neural network, for example, by referring to a mode of transfer between neurons in human brain, and may further perform self-learning continuously. Applications such as intelligent cognition of the electronic device 100, for example, image recognition, face recognition, speech recognition, and text understanding, may be implemented by using the NPU.

The internal memory 121 may include one or more random access memories (random access memories, RAM) and one or more non-volatile memories (non-volatile memory, NVM).

The random access memories may include a static-random access memory (static random-access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM; for example, a fifth generation DDR SDRAM is generally referred to as DDR5 SDRAM), and the like.

The non-volatile memory may include a magnetic disk storage device and a flash memory.

The flash memory may be classified, based on an operating principle, into an NOR FLASH, an NAND FLASH, a 3D NAND FLASH, and the like; may be classified, based on a quantity of electric potential levels of a cell, into a single-level cell (Single-Level Cell, SLC), a multi-level cell (Multi-Level Cell, MLC), a triple-level cell (Triple-Level Cell, TLC), a quad-level cell (Quad-Level Cell, QLC), and the like; or may be classified, based on a storage specification, into a universal flash storage (Universal Flash Storage, UFS), an embedded multimedia card (Embedded Multi Media Card, eMMC), and the like.

The random access memories may be directly read and written by the processor 110, may be configured to store executable programs (for example, machine instructions) of an operating system or other running programs, or may be configured to store data of users and applications.

The non-volatile memory may also store the executable program, the data of the user, and the data of the application, and the like, which may be loaded into the random access memory in advance for directly reading and writing by the processor 110.

The external memory interface 120 may be configured to connect to an external non-volatile memory, to expand a storage capability of the electronic device 100. The external non-volatile memory communicates with the processor 110 by using the external memory interface 120, to implement a data storage function. For example, files such as music and a video are stored in the external non-volatile memory.

The internal memory 121 or the external memory interface 120 is configured to store one or more computer programs. The one or more computer programs are configured to be executed by the processor 110. The one or more computer programs include a plurality of instructions. When the plurality of instructions are executed by the processor 110, the Bluetooth audio playback method performed on the electronic device 100 in the foregoing embodiments may be implemented, to implement a function of avoiding jittering of Track tracks of Bluetooth audio.

The electronic device 100 may implement audio functions through the audio module 170, the speaker 170A, the phone receiver 170B, the microphone 170C, the headset jack 170D, the application processor, and the like. The audio function includes, for example, music playing and sound recording.

The audio module 170 is configured to convert digital audio information into an analog audio signal for output, and is also configured to convert analog audio input into a digital audio signal. The audio module 170 may be further configured to encode and decode the audio signal. In some embodiments, the audio module 170 may be disposed in the processor 110, or some function modules in the audio module 170 are disposed in the processor 110.

The speaker 170A, also referred to as a "horn", is configured to convert an electrical audio signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When the electronic device 100 is configured to answer a call or receive voice information, the receiver 170B may be put close to a human ear to receive a voice.

The microphone 170C, also referred to as a "voice tube" or a "mike", is configured to convert a sound signal into an electrical signal. When making a call or sending voice information, a user may make a sound by approaching a mouth to the microphone 170C, to input a sound signal to the microphone 170C. The electronic device 100 may be provided with at least one microphone 170C. In some other embodiments, the electronic device 100 may be provided with two microphones 170C, and may further implement a noise reduction function in addition to collecting a sound signal. In some other embodiments, three, four, or more microphones 170C may alternatively be disposed in the electronic device 100, to collect a sound signal, reduce noise, further identify a sound source, implement a directional recording function, and the like.

The headset jack 170D is configured to be connected to a wired headset. The headset jack 170D may be a USB interface 130, or may be a 3.5 mm open mobile terminal 100 platform (open mobile terminal platform, OMTP) standard interface or cellular telecommunications industry association of the USA (cellular telecommunications industry association of the USA, CTIA) standard interface.

The pressure sensor 180A is used to sense a pressure signal, and can convert the pressure signal into an electrical signal. In some embodiments, the pressure sensor 180A may be arranged in the display 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, the capacitance between electrodes changes. The electronic device 100 determines intensity of a pressure based on a change of the capacitance. When a touch operation is performed on the display screen 194, the electronic device 100 detects a touch operation intensity through the pressure sensor 180A. The electronic device 100 may further calculate a touch position based on a detection signal of the pressure sensor 180A. In some embodiments, touch operations performed at a same touch location but having different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion pose of the electronic device 100. In some embodiments, angular velocities of electronic device 100 around three axes (which are x, y, and z axes) may be determined by using the gyro sensor 180B. The gyroscope sensor 180B may be used for image stabilization during shooting. For example, when a shutter is pressed, the gyroscope sensor 180B detects an angle at which the electronic device 100 jitters, calculates, based on the angle, a distance for which a lens module needs to compensate, and allows a lens to cancel the jitter of the electronic device 100 through reverse motion, to implement image stabilization. The gyroscope sensor 180B may be further used in navigation and a motion sensing game scenario.

The barometric pressure sensor 180C is configured to measure an air pressure. In some embodiments, the electronic device 100 calculates an altitude through the air pressure value measured by the barometric pressure sensor 180C, and assists positioning and navigation.

The magnetic sensor 180D may include a Hall sensor. The electronic device 100 may detect opening and closing of a flip leather cover by using the magnetic sensor 180D. In some embodiments, when the electronic device 100 is a clamshell phone, the electronic device 100 may detect opening and closing of a flip based on the magnetic sensor 180D. Further, features such as automatic unlocking of the flip cover are set based on the detected opening and closing states of the leather case or opening and closing states of the flip cover.

The acceleration sensor 180E may detect magnitudes of acceleration in various directions (usually on three axes) of the electronic device 100, and may detect a magnitude and a direction of gravity when the electronic device 100 is still. The acceleration sensor 180E may be further configured to recognize a posture of the electronic device 100, and is applied to switching between a landscape mode and a portrait mode, a pedometer, or another application.

The distance sensor 180F is configured to measure a distance. The electronic device 100 may measure a distance through infrared light or laser. In some embodiments, in a shooting scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light emitting diode. The electronic device 100 uses the photodiode to detect reflected infrared light from a nearby object. When sufficient reflected light is detected, it may be determined that an object exists near the electronic device 100. When insufficient reflected light is detected, the electronic device 100 may determine that no object exists near the electronic device 100. The electronic device 100 may detect, by using the optical proximity sensor 180G, that a user holds the electronic device 100 close to an ear for a call, to implement automatic screen-off to save power. The optical proximity sensor 180G may be further configured to automatically unlock and lock the screen in a leather cover mode and a pocket mode.

The ambient light sensor 180L is configured to perceive ambient light brightness. The electronic device 100 may adaptively adjust a brightness of the display 194 based on the perceived ambient light brightness. The ambient light sensor 180L may be further configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to acquire a fingerprint. The electronic device 100 may implement fingerprint unlocking, application lock accessing, fingerprint photographing, fingerprint-based call answering, and the like by using a feature of the collected fingerprint.

The temperature sensor 180J is configured to detect a temperature. In some embodiments, the electronic device 100 performs a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption and implement thermal protection. In some other embodiments, when the temperature is less than another threshold, the electronic device 100 heats the battery 142, to prevent the electronic device 100 from being abnormally powered off due to the low temperature. In some other embodiments, when the temperature is lower than still another threshold, the electronic device 100 boosts an output voltage of the battery 142 to prevent an abnormal shutdown caused by the low temperature.

The touch sensor 180K is also referred to as a "touch device". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor may provide, by using the display screen 194, visual output related to the touch operation. In some other embodiments, the touch sensor 180K may alternatively be disposed on a surface of the electronic device 100, at a location different from that of the display 194.

The bone conduction sensor 180M may obtain a vibration signal. In some embodiments, the bone conduction sensor 180M may obtain a vibration signal of a vibration bone in a human vocal-cord part. The bone conduction sensor 180M may alternatively contact a human pulse to receive a blood pressure beating signal. In some embodiments, the bone conduction sensor 180M may alternatively be arranged in the headset, combined to form a bone conduction headset. The audio module 170 may obtain a speech signal through parsing based on the vibration signal of the vibration bone of the vocal-cord part that is obtained by the bone conduction sensor 180M, to implement a speech function. The application processor may parse heart rate information based on the blood pressure beating signal acquired by the bone conduction sensor 180M, to implement a heart rate measurement function.

The key 190 includes an on/off key, a volume key, or the like. The button 190 may be a mechanical button or a touch button. The electronic device 100 may receive a key input and generate a key signal input related to user settings and function control of the electronic device 100.

The engine 191 may generate a vibration prompt. The motor 191 may be configured to provide a vibration prompt for an incoming call, and may be further configured to provide vibration feedback for a touch. For example, touch operations performed on different applications (for example, photographing and audio playback) may correspond to different vibration feedback effects. The motor 191 may also correspond to different vibration feedback effects for touch operations applied to different regions of the display 194. Different application scenarios (for example, a time reminder, information receiving, an alarm clock, and a game) may also correspond to different vibration feedback effects. Customization of a touch vibration feedback effect may further be supported.

The indicator 192 may be an indicator light, may be configured to indicate a charging status or a power change, and may be further configured to indicate a message, a missed incoming call, a notification, and the like.

The SIM card interface 195 is used for connecting a SIM card. The SIM card may be inserted into the SIM card interface 195 or removed from the SIM card interface 195 to implement contact with and separation from the electronic device 100. The electronic device 100 may support 1 or N SIM card interfaces, N being a positive integer greater than 1. The SIM card interface 195 can support a nano SIM card, a micro SIM card, a SIM card, and the like. A plurality of cards may be inserted into a same SIM card interface 195 at the same time. The plurality of cards may be of a same type or may be of different types. The SIM card interface 195 may be compatible with different types of SIM cards. The SIM card interface 195 is also compatible with an external storage card. The electronic device 100 interacts with a network through a SIM card, to implement functions such as a call and data communication. In some embodiments, the electronic device 100 uses an eSIM, namely, an embedded SIM card. The eSIM card may be embedded into the electronic device 100, and cannot be separated from the electronic device 100.

An embodiment further provides a computer storage medium. The computer storage medium stores computer instructions, and when the computer instructions are run on the electronic device 100, the electronic device 100 is enabled to perform the foregoing related method steps to implement the Bluetooth audio playback method in the foregoing embodiments.

The embodiments further provide a computer program product. When the computer program product is run on a computer, the computer is enabled to perform the foregoing related steps to implement the Bluetooth audio playback method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the Bluetooth audio playback method in the foregoing method embodiments.

The electronic device 100, computer storage medium, and computer program product or chip provided in the embodiments are all configured to perform the corresponding method provided above. Therefore, for beneficial effects that can be achieved, reference may be made to the beneficial effects in the corresponding method, and details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic, mechanical, or another form.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in embodiments of this application may be integrated into one processing unit, or each of the units may exist alone physically, or two or more units are integrated into one unit. The integrated unit may be implemented in the form of hardware, or may be implemented in the form of a software function unit.

If the integrated unit is implemented in the form of a software functional unit and sold or used as an independent product, the integrated unit may be stored in a readable storage medium. Based on such an understanding, the technical solutions in embodiments of this application essentially, or the part contributing to conventional technologies, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing implementations are merely intended to describe the technical solutions of this application, but are not intended to limit the technical solutions of this application. Although this application is described in detail with reference to the foregoing example implementations, a person of ordinary skill in the art should understand that modifications or equivalent replacements to the technical solutions of this application should not depart from the spirit and scope of the technical solutions of this application.

The invention claimed is:

1. A Bluetooth audio playback method, applied to an electronic device, wherein the electronic device is communicatively connected to a Bluetooth device, and the method comprises:

determining a quantity of Track tracks in response to an operation instruction on the electronic device by a user, wherein the quantity of the Track tracks is determined by an audio manager in an audio framework layer of the electronic device, and wherein the audio manager creates Track tracks for audio data based on a playing command and deletes Track tracks when determining that playback of the audio data ends;

generating, by the audio manager, quantity update information of the Track tracks when creating or deleting the Track tracks;

sending a playing instruction to the Bluetooth device when determining, based on the quantity update information, that the quantity of the Track tracks increases, wherein the playing instruction is used for setting an audio status of the Bluetooth device to playing; and sending a pause instruction to the Bluetooth device when determining, based on the quantity of the Track tracks decreases, wherein the pause instruction is used for setting the audio status of the Bluetooth device to pause.

2. The Bluetooth audio playback method according to claim 1, wherein the determining a quantity of Track tracks in response to an operation instruction on the electronic device by a user comprises:

acquiring, by the audio manager, the playing command from a media application, creating the Track tracks of the audio data based on the playing command, and determining the quantity of the Track tracks.

3. The Bluetooth audio playback method according to claim 2, wherein the sending a playing instruction to the Bluetooth device when determining the quantity of the Track tracks increases comprises:

acquiring, by a hardware abstraction layer of the electronic device, the quantity of the Track tracks from the audio framework layer;

sending, by the hardware abstraction layer, the audio status being playing to a Bluetooth protocol stack of the hardware abstraction layer when determining that the quantity of the Track tracks increases; and sending, by the Bluetooth protocol stack, the playing instruction to the Bluetooth device in response to the audio status being playing.

4. The Bluetooth audio playback method according to claim 1, wherein the sending a pause instruction to the Bluetooth device when determining the quantity of the Track tracks decreases comprises:

sending, by a hardware abstraction layer of the electronic device, the audio status being pause to a Bluetooth protocol stack when determining that the quantity of the Track tracks decreases; and sending, by the Bluetooth protocol stack, the pause instruction to the Bluetooth device in response to the audio status being pause.

5. The Bluetooth audio playback method according to claim 1, wherein the determining a quantity of Track tracks in response to an operation instruction on the electronic device by a user comprises:

acquiring, by the audio manager, a pause command from an application; and deleting, by the audio manager, the Track tracks based on the pause command, and determining the quantity of the Track tracks.

6. The Bluetooth audio playback method according to claim 1, wherein the determining a quantity of Track tracks in response to an operation instruction on the electronic device by a user comprises:

in response to an operation of switching from audio data of a first playing scenario to audio data of a second playing scenario of an application, deleting, by the audio manager, Track tracks of the audio data of the first playing scenario, and creating Track tracks of the audio data of the second playing scenario, wherein the audio data of the first playing scenario and the audio data of the second playing scenario are not continuous.

7. The Bluetooth audio playback method according to claim 1, wherein the sending a playing instruction to the Bluetooth device when the quantity of the Track tracks increases comprises:

sending the playing instruction to the Bluetooth device when the quantity of the Track tracks is changed from 0 to 1.

8. The Bluetooth audio playback method according to claim 1, wherein the sending a pause instruction to the Bluetooth device when the quantity of the Track tracks decreases comprises:

sending the pause instruction to the Bluetooth device when the quantity of the Track tracks is changed from 1 to 0.

9. An electronic device, comprising a processor and a memory, wherein the processor is coupled to the memory;

the memory is configured to store program instructions; and the processor is configured to read the program instructions stored in the memory to cause the electronic device to perform following operations:

determining a quantity of Track tracks in response to an operation instruction on the electronic device by a user, wherein the quantity of the Track tracks is determined by an audio manager in an audio framework layer of the electronic device, and wherein the audio manager creates Track tracks for audio data based on a playing command and deletes Track tracks when determining that playback of the audio data ends;

generating, by the audio manager, quantity update information of the Track tracks when creating or deleting the Track tracks;

sending a playing instruction to a Bluetooth device when determining, based on the quantity update information, the quantity of the Track tracks increases, wherein the playing instruction is used for setting an audio status of the Bluetooth device to playing; and sending a pause instruction to the Bluetooth device when determining, based on the quantity update information, the quantity of the Track tracks decreases, wherein the pause instruction is used for setting the audio status of the Bluetooth device to pause.

10. A non-transitory computer-readable storage medium storing program instructions, which when executed by a processor, cause the processor to perform operations, the operations comprising:

determining a quantity of Track tracks in response to an operation instruction on an electronic device by a user, wherein the quantity of the Track tracks is determined by an audio manager in an audio framework layer of the electronic device, and wherein the audio manager creates Track tracks for audio data based on a playing command and deletes Track tracks when determining that playback of the audio data ends;

generating, by the audio manager, quantity update information of the Track tracks when creating or deleting the Track tracks;

sending a playing instruction to a Bluetooth device when determining, based on the quantity update information, the quantity of the Track tracks increases, wherein the playing instruction is used for setting an audio status of the Bluetooth device to playing; and sending a pause instruction to the Bluetooth device when determining, based on the quantity update information, the quantity of the Track tracks decreases, wherein the pause instruction is used for setting the audio status of the Bluetooth device to pause.

11. The electronic device according to claim 9, wherein the determining a quantity of Track tracks in response to an operation instruction on the electronic device by a user comprises:

acquiring, by the audio manager, the playing command from a media application, creating the Track tracks of the audio data based on the playing command, and determining the quantity of the Track tracks.

12. The electronic device according to claim 11, wherein the sending a playing instruction to the Bluetooth device when determining the quantity of the Track tracks increases comprises:

acquiring, by a hardware abstraction layer of the electronic device, the quantity of the Track tracks from the audio framework layer;

sending, by the hardware abstraction layer, the audio status being playing to a Bluetooth protocol stack of the hardware abstraction layer when determining that the quantity of the Track tracks increases; and sending, by the Bluetooth protocol stack, the playing instruction to the Bluetooth device in response to the audio status being playing.

13. The electronic device according to claim 9, wherein the sending a pause instruction to the Bluetooth device when determining the quantity of the Track tracks decreases comprises:

sending, by a hardware abstraction layer of the electronic device, the audio status being pause to a Bluetooth protocol stack when determining that the quantity of the Track tracks decreases; and sending, by the Bluetooth protocol stack, the pause instruction to the Bluetooth device in response to the audio status being pause.

14. The electronic device according to claim 9, wherein the determining a quantity of Track tracks in response to an operation instruction on the electronic device by a user comprises:

acquiring, by the audio manager, a pause command from a media application; and deleting, by the audio manager, the Track tracks based on the pause command, and determining the quantity of the Track tracks.

15. The electronic device according to claim 9, wherein the determining a quantity of Track tracks in response to an operation instruction on the electronic device by a user comprises:

in response to an operation of switching from audio data of a first playing scenario to audio data of a second playing scenario of an application, deleting, by the audio manager, Track tracks of the audio data of the first playing scenario, and creating Track tracks of the audio data of the second playing scenario, wherein the audio data of the first playing scenario and the audio data of the second playing scenario are not continuous.

16. The electronic device according to claim 9, wherein the sending a playing instruction to the Bluetooth device when determining the quantity of the Track tracks increases comprises:

sending the playing instruction to the Bluetooth device when the quantity of the Track tracks is changed from 0 to 1.

17. The electronic device according to claim 9, wherein the sending a pause instruction to the Bluetooth device when determining the quantity of the Track tracks decreases comprises:

sending the pause instruction to the Bluetooth device when the quantity of the Track tracks is changed from 1 to 0.

18. The computer-readable storage medium to claim 10, wherein the determining a quantity of Track tracks in response to an operation instruction on the electronic device by a user comprises:

acquiring, by the audio manager, the playing command from an application, creating the Track tracks of the audio data based on the playing command, and determining the quantity of the Track tracks.

19. The method according to claim 1, wherein sending the playing instruction and the pause instruction is performed independently of whether a media application of the electronic device is registered with a media session management mechanism.

20. The electronic device according to claim 9, wherein sending the playing instruction and the pause instruction is performed independently of whether a media application of the electronic device is registered with a media session management mechanism.

* * * * *